United States Patent
Fischer

[11] 3,714,436
[45] Jan. 30, 1973

[54] RADIATION BACKSCATTERING APPARATUS USING AN APERTURED PRECIOUS STONE AS AN OBJECT SUPPORT

[76] Inventor: Helmut Fischer, Bergwaldstrasse 28, 7261 Gechingen, Germany

[22] Filed: Aug. 10, 1970

[21] Appl. No.: 62,248

[30] Foreign Application Priority Data

March 20, 1970 Germany ............... P 20 13 270.1

[52] U.S. Cl. .......................... 250/105, 250/83.3 D
[51] Int. Cl. ................................ H01j 1/52
[58] Field of Search ................. 250/83.3 D, 105

[56] References Cited

UNITED STATES PATENTS

| | | |
|---|---|---|
| 3,319,067 | 5/1967 | Joffe et al. ........................ 250/105 |
| 3,529,158 | 9/1970 | Joffe et al. ........................ 250/105 X |
| 3,421,000 | 1/1969 | Lieber et al. ..................... 250/105 |

Primary Examiner—William F. Lindquist
Attorney—Milton Robert Kestenbaum

[57] ABSTRACT

An apertured ring made of a metal having a lower atomic number for use in instruments for measuring the thickness of layers by means of back-scattered radio active radiation, comprises on its upper side a bearing surface for the object to be measured, a small recess in relation to the height of said ring for the unhindered passage of radiation, said recess leading into the bearing surface, and a recess in the form of a circular cone which extends from the lower side of the apertured ring and leads into the first small recess in the vicinity of its upper end. The small recess is provided in a jewel for fine mechanics which has a low atomic number and is held adhesively in a bore on the upper side of the ring.

12 Claims, 8 Drawing Figures

PATENTED JAN 30 1973

INVENTOR.
HELMUT FISCHER

INVENTOR.
HELMUT FISCHER

RADIATION BACKSCATTERING APPARATUS USING AN APERTURED PRECIOUS STONE AS AN OBJECT SUPPORT

The invention relates to an apertured ring made of a metal having a lower atomic number for use in instruments for measuring the thickness of layers by means of back-scattered radio active radiation, said ring comprising on its upper side a bearing surface for the object to be measured, a small recess in relation to the height of said ring for the unhindered passage of radiation, said recess leading into the bearing surface, and a recess in the form of a circular cone which extends from the lower side of the apertured ring and leads into the first small recess in the vicinity of its upper end.

Apertured rings of this kind have several functions:

1. The area around the small recess acts as a bearing surface for the object to be measured.
2. The upper inner edge of the small recess defines the surface to be measured.
3. The apertured ring is practically opaque for radiation when the material is of sufficient thickness, since it is made of a metal having a lower atomic number, such as aluminum or its alloys. On the other hand the apertured ring only back-scatters a few radio active rays but these are still within the statistical margin of error and have a constant value.

Before the thickness of layers can be measured by back-scattering, the measuring instrument must first be calibrated. For this purpose it is necessary to take measuring standards in which a thin layer is applied to a small flat carrier foil, the thickness of said layer having been accurately calculated by other measuring methods. The measuring standard is therefore uniform.

In contrast a great number of layers to be measured have a one-dimensional or two-dimensional curvature. In this connection it is possible to imagine gold-plated electric conductors representing cylinders, the gold layer on rivet heads which are often hemi-spherical, or the faces of wires inside a transistor housing, to which the transistorized system is later both electrically and mechanically connected. The faces of these wires are very small on the one hand and not entirely flat, but it is necessary for measurements to be taken on them.

Since the measuring standards are level, but the objects to be measured can be greatly curved and also small, the only solution is to make the short recess so small that for the purposes of radio active radiation it only makes visible that area of the object to be measured which appears to be flat.

With measuring problems of this kind — if for example a circular small recess is selected — diameters of approximately 0.5 to 1.2 mm are chosen for this recess. On the one hand the geometry of the small recess conclusively determines the measuring result, but on the other hand it is very difficult to introduce a series of identical small recesses into the apertured ring by boring, milling or sawing. Even if the apertured ring is anodized, the bearing surface is nevertheless not hard enough and wears away. The distance from the emitter, the length of the short recess and sometimes also the upper inner edge of the short recess vary so that there are no optimum conditions for measurement.

The object of the invention is to provide an apertured ring which eliminates the above mentioned disadvantages and whereby it is particularly possible to economically produce small recesses having stable and constant dimensions.

This problem is solved in accordance with the invention in that the first mentioned short recess is provided in a jewel for fine mechanics which is essentially made of materials having a low atomic number.

High precision jewels are used in horology, but such precious stones are cheap since they are mass produced articles. They are always made of materials having a low atomic number, as impurities are negligible and the approximate dimensions of the jewels, particularly their bores, which can be used as small recesses lie exactly within the range in which they can be used "for purposes other than originally intended" as it is described in the art; the upper sides of most of the jewels are flat so that the upper inner edge precisely defines a surface and the industry producing these jewels can accurately grind or cut these surfaces by simple machining to within a few nanometers, in a manner known per se.

It is advantageous if the jewel has a through hole, as such jewels have finely-graded holes. The surface of the object to be measured as seen from the emitter is always circular and therefore has a geometric value which is easy to determine.

It is advantageous if the jewel is standardized in accordance with DIN or some equivalent standard and adapted in height $h$ to the energy of the radiation. Such jewels are available in all parts of Europe, have fixed tolerances and dimensions and such precious stones are very cheap, since they are produced in great numbers.

It is advantageous if the jewel takes the form of the jewels standardized by the shape LFZ according to DIN 8257, and if its olive projects downwards. The jewel is flat with a cylindrical hole or bore and a wider oil sink or olive. The jewel is nevertheless relatively thick, has a relatively short hold due to olive-cutting and the olive approximately represents a continuation of the circular cone-shaped recess of the apertured ring.

It is advantageous if the jewel is standardized in accordance with the PZ shape as defined in DIN 8262. These jewels are ring jewels with a cylindrical hole or bore of the same thickness at all points, irrespective of how much they have been ground.

It is advantageous if the jewel is a cap jewel which is radially divided by an axial cut and the two halves of which define between them a longitudinal slot. Such an embodiment is particularly suitable for measuring layers on cylindrical objects, such as wires.

It is advantageous if the cap jewel is standardized in accordance with DIN or some equivalent standard and adapted in height $h$ to the energy of the radiation. These cap jewels are particularly cheap, have fixed dimensions and tolerances and are available all over Europe. Furthermore they are easy to control for the purposes of adaptation.

It is advantageous if prior to cutting the cap jewel has the shape of cap jewels standardized in accordance with the shape DF in DIN 8263. These cap jewels are flat with a polished upper and lower faces and particularly suitable for producing slots and are available in great numbers.

It is advantageous if the jewel consists of a combination of oxygen and an element having the maximum atomic number 14 and traces of impurities. Such jewels are practically opaque for radio active radiation, scatter little radiation and do not require a high degree of purity.

It is advantageous if the jewel is made of ruby, agate, sapphire, spinel, beryllium or the like. These jewels have been used to great advantage in the past.

It is advantageous if the jewel is made of diamond. Diamond has the lowest atomic number of all the materials which can be used in this connection, namely $Z = 6$, and is ideally suited both with regard to its application in nuclear physics and as regard to its hardness, in which case industrial diamonds can easily be used.

It is advantageous if a bore in which the jewel is held is introduced into the upper side. Such a bore represents a simple and advantageous means of gripping the jewels.

It is advantageous if the jewel is adhesively secured in the bore. This constitutes an accurate fastening which can also be easily carried out during mass production without the aid of specialists from the jewellery industry.

It is advantageous if the upper side of the secured jewel is ground down to its height $h$ which is adapted to correspond to the energy of the radiation. In this manner the jewel can be ground in its setting and held by means of the apertured ring which provides a good holding base.

It is advantageous if the cap jewel is divided by a thin radial and axially extending cut, if a foil corresponding to the width of the slot is placed between the thereby produced two halves, if said two halves are pressed against the foil, if the cap jewel in this configuration is adhesively secured in the bore, and if the foil is later removed from the slot. Slots having a defined spacing and parallel edges can be easily produced in this manner.

Other advantages and features of the invention are shown in the following description of two preferred embodiments. In the drawings.

Figure 1:
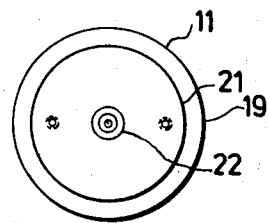
FIG. 1 shows a full-size plan view of an apertured ring.
Figure 2:
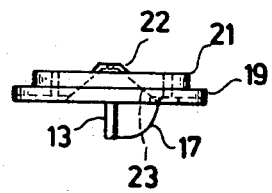
FIG. 2 shows a side view of FIG. 1.
Figure 3:
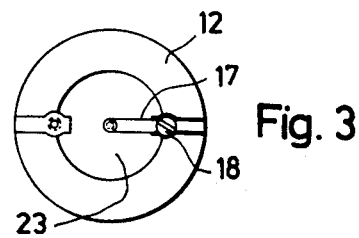
FIG. 3 shows an underneath plan view of FIG. 1.
Figure 4:
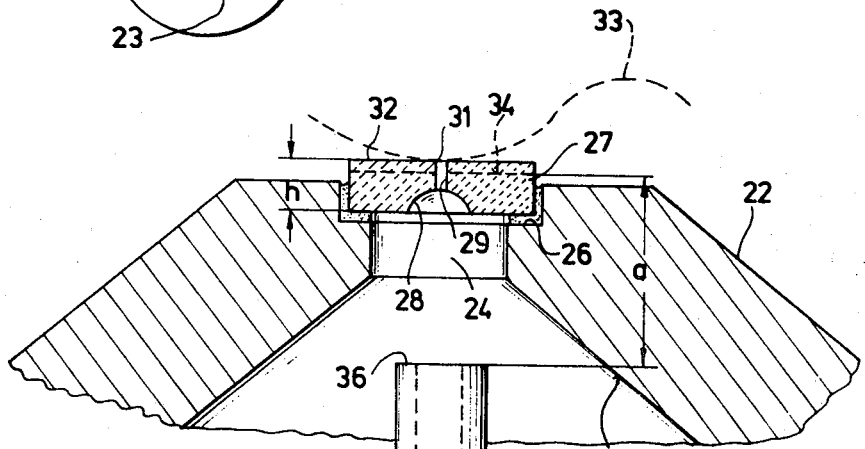
FIG. 4 shows a broken-away and essentially enlarged radial section through the apertured ring.
Figure 5:
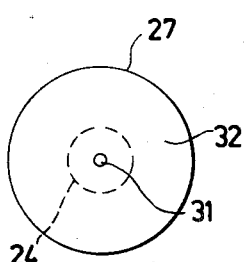
FIG. 5 shows a plan view of the jewel with a through hole as shown in FIG. 4.
Figure 6:
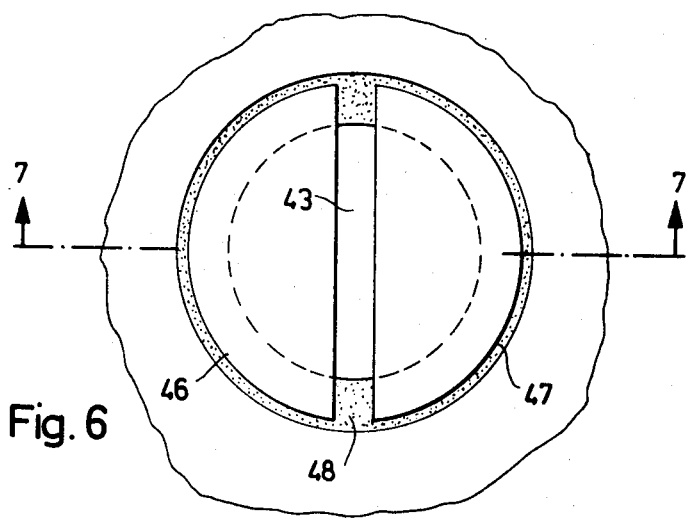
FIG. 6 shows a plan view of a slotted cap jewel in its setting.
Figure 7:
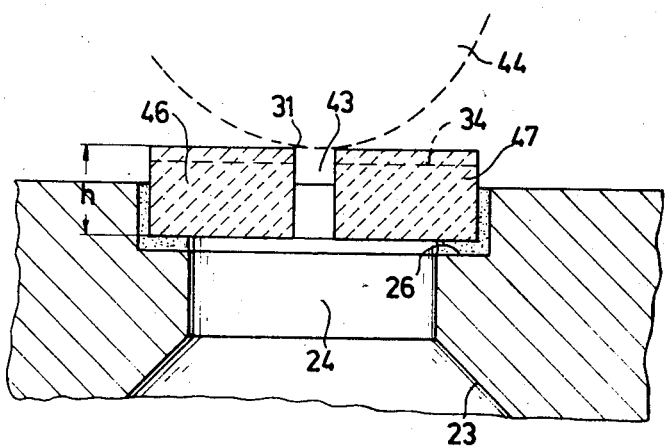
FIG. 7 shows a section along the line 7—7 shown in FIG. 6.

An apertured ring 11 made of an aluminum alloy has a small platinum tube 13, in the longitudinal bore 14 of which is located a radio active nuclide 16 which emits beta rays. The longitudinal bore 14 is closed by a foil. From the upper side of the foil a thin pencil of beta rays is emitted in an upward direction, as shown in FIGS. 2 and 4. The tube 13 is fastened to the apertured ring 11 by means of an arm 17 and a screw 18. When seen from the side as in FIG. 2, the apertured ring 11 appears as two superposed circular discs 19 and 21. A small truncated cone 22 is supported on the disc 21 and introduced from below into the apertured ring 11 is a recess 23 in the shape of a circular cone which has an obtuse opening angle and leads upwards into a 2-stage bore 24 which, in the present embodiment, has a diameter of about 1.5 mm at its narrowest point and has a stage 26. A jewel 27 having a through hole as defined by the LFZ shape in DIN 8257 and lying on the stage 26 is fixed, coaxially to the tube 13, into the bore 24 by means of a two-component adhesive. The narrower section of the bore 24 has an even larger diameter than that of the olive 28 which would serve to hold a drop of oil when used in timepieces. A cylindrical hole 29 having a sharp upper inner edge 31 which precisely defines the surface for measurement extends upwards in a vertical direction. The upper side of the jewel 27 represents the bearing surface 32 of an object 33 to be measured, which is indicated by broken lines. In spite of the fact that the object 33 to be measured has an irregular surface, a surface which from the radio active nuclide 16 appears to be flat is shielded from the object 33 to be measured by the edge 31.

Figure 8:
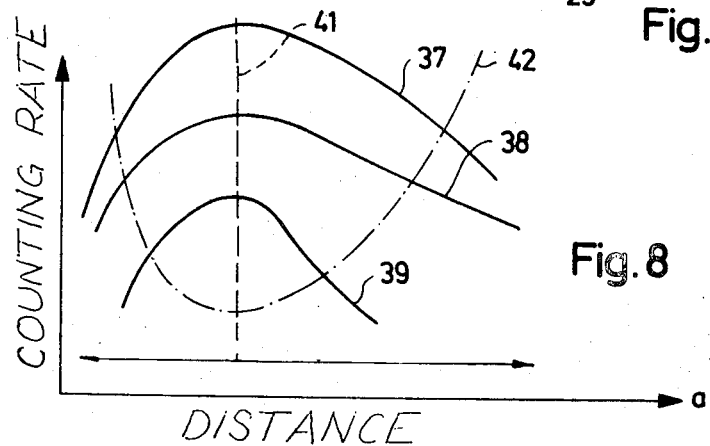
FIG. 8 shows a graph or diagram.

The length of the hole 29 is an important value. If it is assumed that a radiation of given hardness is in use, the material surrounding a hole 29 which is too short would be transparent. Then the edge 31 would not accurately define the surface to be measured. If, on the other hand, the hole 29 is too long, its inner wall is also long. Beta rays back-scattered from the surface to be measured can therefore only leave the hole 29 in those cases where their return path is so straight that they can pass freely through the hole. In another case the back-scattered beta rays are absorbed by the material surrounding the hole 29. However, with this type of measurement made by means of radio active radiation, the main concern is to catch as many rays as possible being back-scattered from the surface to be measured. If a great portion is absorbed by the back-scattered rays, there is less certainty regarding the accuracy of the measurements. The drawing shows that the rays back-scattered from the surface to be measured are scarcely obstructed by the olive 28. A standard emitter therefore always includes an optimum length for the hole 29. In the form in which the jewels 27 are supplied by the industry supplying timepieces, they do not usually have the optimum height $h$. The jewel 27 therefore must be slightly ground, as indicated by the straight broken line 34. The line 34 follows the path of an accurately defined plane 34. The distance $a$ between the line 34 and the upper edge 36 of the small platinum tube 13 is also critical (see FIG. 8). In this diagram the counting rate is plotted as an ordinate and the distance $a$ as an abscissa. Several curves 37, 38 and 39 can be seen, and for example the curve 37 can apply to a platinum layer, the curve 38 to a gold layer and the curve 39 to a nickel layer. It can be seen that with a given distance $a$ the counting rate reaches its maximum. The optimum of all the curves 37, 38 and 39 lies approximately on the broken straight line 41. The branches of each curve 37, 38, 39 to the right of this straight line 41 fall away because the spacing becomes too great and therefore too few rays hit the surface to be measured. The falling away of the left hand branches of the curves is due to the fact that the lead tube 13 shields the detector below said tube 13 from the back-scattered beta rays.

The curve 42 in the form of dot and dash lines indicates the relative measuring error which is naturally at a minimum when maximum beta ray back-scattering occurs. The invention therefore also makes it possible to improve the optimum distance $a$ since the bearing surface 32 is determined by an accurately defined plane It should again be noted that the jewel rarely has the optimum height $h$. This can be optimized by grinding and the bearing surface 32 then coincides with the line 34.

Although wires can also be measured with the described means, it has proved more advantageous to give the recess defining the surface to be measured the form of a rectangular slot 43 on the upper inner edge 31 of which the cylindrical wire 44 can be supported. In this case it can be seen particularly clearly that the edge 31 is subjected to mechanical stress and that the surface to be measured would vary considerably if the edge 31 lost its rectangular, sharp-edged shape. The two-staged bore 24 with its stage 26 can be seen again in this embodiment. The jewel used in this embodiment was a cap jewel as defined by the DF shape in DIN 8263. It can be obtained in the trade as a circular disc, its upper and lower faces having been polished. This cap jewel was divided along a radius into two halves 46 and 47 by an axial cut and secured so that it was mounted on the stage 26. In order to obtain a more accurately defined slot 43 a flat foil of known thickness was placed therein and the two halves 46, 47 pressed together. When the adhesive 48 set, the foil could be withdrawn from the slot 43. If a different height $x$ is required to that which the cap jewels usually have in the trade, it is ground, e.g. as far as the line 34. The same optimum dimensions apply here as in the first embodiment.

If high-energy emitters are used, the height $h$ is comparatively great. The height $h$ is less with lower energy emitters.

Without having any doubt as to its mechanical rigidity the jewel according to the first embodiment for example can be ground in spite of its olive 28 until the minimum distance between the olive 28 and the line 34 is about one-tenth mm.

The preceding text has described apertured rings, the holes and slots of which have constant values. However, there are also apertured rings the slots of which are variable in width, i.e. in which the two upper inner edges 31 of the slot can be moved towards or away from one another. The apertured ring is divided into two halves for this purpose and each half then supports a section 46, 47 of the jewel. In many such cases reference is also made to an apertured board. If the extra expenditure is not considered inconvenient or if one does not wish to resort to the jewels already used in fine mechanics, suitable precious or semi-precious stones can naturally be also specially ground for the purpose of the invention. For example, the edges of a variable apertured ring in the vicinity of the slot or the edges of an adjustable apertured table could then be covered with the specially manufactured precious stones and, apart from the cost of special preparations, would have the same advantages as the invention with regard to accurate and optimum dimensions, dimensional stability, etc.

Reference herein to DIN and DIN numbers refer to the published standards of the German Standards Committee for Watches in the German Standards Committee (DNA). Reference to various letter designated shapes, such as shape LFZ, shape PZ, and shape DF refer to the jewel shapes determined in these standards. LFZ shape is designated a flat jewel for watches, as published in DIN 8257, sheet 1; PZ shape is designated a ring jewel for instruments in DIN 8262, sheet two; and shape DF is designated a cap jewel for instruments in DIN 8263.

What I claim is:

1. In an instrument for measuring the thickness of layers by means of radiation backscattering, the combination with
   a radiation absorbing housing,
   a radiation source mounted therein, and
   a ring secured to the housing of a low atomic number having a hole therethrough which opens on the side of the ring towards the radiation source in the approximate shape of a circular cone,
   the improvement comprising a precious stone secured to the ring and having on one side a bearing surface for the object to be measured and a hole in the bearing surface leading into the hole in the ring, the length of the hole through the precious stone being short in comparison to the height of the ring for easy passage of primary and backscattered radiation.

2. In an instrument according to claim 1 the precious stone has a punched-through hole.

3. In an instrument according to claim 2 the precious stone is a standardized shape of a flat jewel having a cylindrical hole and a wider olive with the olive leading into the hole in the ring.

4. In an instrument according to claim 2 the precious stone is a standardized shape of a ring jewel having a cylindrical hole.

5. In an instrument according to claim 1, the precious stone is a radially divided cap jewel having two halves which define a longitudinal slot between them.

6. In an instrument according to claim 5 the precious stone is a standardized shape of a flat cap jewel with polished upper and lower surfaces.

7. In an instrument according to claim 1 the precious stone is a diamond.

8. In an instrument according to claim 1 the ring has a bore on its other side in which the precious stone is set.

9. In an instrument according to claim 8 the precious stone is adhesively secured in the bore.

10. In an instrument according to claim 1 the precious stone is a standardized jewel in accordance with the standards for fine mechanisms and has a height proportioned to the energy of radiation through the ring.

11. In an instrument according to claim 1 the precious stone is one of the group consisting of ruby, agate, sapphire and spinel.

12. In an instrument according to claim 1 the precious stone has a ground-on-the-ring height adapted to the energy of radiation through the device.

* * * * *